United States Patent
Breault et al.

(10) Patent No.: US 6,461,753 B1
(45) Date of Patent: Oct. 8, 2002

(54) FUEL CELL WITH A DIRECT ANTIFREEZE IMPERMEABLE COOLER PLATE

(75) Inventors: Richard D. Breault, North Kingstown, RI (US); Margaret M. Steinbugler, East Windsor; David A. Condit, Avon, both of CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/542,209

(22) Filed: Apr. 4, 2000

(51) Int. Cl.[7] ................................................ H01M 8/04
(52) U.S. Cl. .......................................... 429/26; 429/22
(58) Field of Search ....................... 429/22.26

(56) References Cited

U.S. PATENT DOCUMENTS

| | | | |
|---|---|---|---|
| 3,779,811 A | * 12/1973 | Bushnell et al. | |
| 5,503,944 A | 4/1996 | Meyer et al. | |
| 5,700,595 A | 12/1997 | Reiser | |
| 5,776,624 A | * 7/1998 | Neutzler | 429/26 |
| 5,998,058 A | 12/1999 | Fredley | |
| 6,013,385 A | * 1/2000 | Dubose | 429/17 |
| 6,316,135 B1 | * 11/2001 | Breault et al. | 429/22 |

FOREIGN PATENT DOCUMENTS

DE 19802490 * 7/1999

* cited by examiner

Primary Examiner—Stephen Kalafut
Assistant Examiner—Tracy Dove
(74) Attorney, Agent, or Firm—Malcolm J. Chisholm, Jr.

(57) ABSTRACT

A fuel cell with a direct antifreeze impermeable cooler plate is disclosed for producing electrical energy from reducing fluid and process oxidant reactant streams. The fuel cell includes an electrolyte secured between an anode catalyst and a cathode catalyst; an anode flow field secured adjacent the anode catalyst for directing the reducing fluid to pass adjacent the anode catalyst; a cathode flow field secured adjacent the cathode catalyst for directing the process oxidant stream to pass adjacent the cathode catalyst; a direct antifreeze impermeable cooler plate secured in heat exchange relationship with the cathode flow field; and a direct antifreeze solution passing through the cooler plate for controlling temperature within the fuel cell. The direct antifreeze solution is an organic antifreeze solution that is not volatile at cell operating temperatures. A preferred direct antifreeze solution is an alkanetriol selected from the group consisting of glycerol, butanetriol, and pentanetriol having favorable low volatility and high surface tension characteristics. The direct antifreeze impermeable cooler plate may be constructed of any material that is impermeable to liquid and compatible with a fuel cell operating environment such as plated metals, or in a preferred embodiment, the cooler plate may be a fine pore commercial graphite material.

11 Claims, 2 Drawing Sheets

FUEL CELL WITH A DIRECT ANTIFREEZE IMPERMEABLE COOLER PLATE

TECHNICAL FIELD

The present invention relates to fuel cells that are suited for usage in transportation vehicles, portable power plants, or as stationary power. plants, and the invention especially relates to a fuel cell that utilizes an antifreeze solution passing through the fuel cell to remove heat from the cell.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A reactant or reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

Manufacture of fuel cells utilizing PEM electrolytes typically involves securing an appropriate first catalyst layer, such as a platinum alloy, between a first surface of the PEM and a first or anode porous substrate or support layer to form an anode electrode adjacent the first surface of the PEM, and securing a second catalyst layer between a second surface of the PEM opposed to the first surface and a second or cathode porous substrate or support layer to form a cathode electrode on the opposed second surface of the PEM. The anode catalyst, PEM, and cathode catalyst secured in such a manner are well-known in the art, and are frequently referred to as a "membrane electrode assembly", or "M.E.A.", and will be referred to herein as a membrane electrode assembly. In operation of PEM fuel cells, the membrane is saturated with water, and the anode electrode adjacent the membrane must remain wet. As hydrogen ions produced at the anode electrode transfer through the electrolyte, they drag water molecules in the form of hydronium ions with them from the anode to the cathode electrode or catalyst. Water also transfers back to the anode from the cathode by osmosis. Product water formed at the cathode electrode is removed from the cell by evaporation or entrainment into a gaseous stream of either the process oxidant or reducing fluid.

While having important advantages, PEM cells are also known to have significant limitations especially related to liquid water transport to, through and away from the PEM, and related to simultaneous transport of gaseous reducing fluids and process oxidant fluids to and from the electrodes adjacent opposed surfaces of the PEM. The prior art includes many efforts to minimize the effect of those limitations. Use of such fuel cells to power a transportation vehicle gives rise to additional problems associated with water management, such as preventing the product water from freezing, and rapidly melting any frozen water during start up whenever the fuel-cell powered vehicle is operated in sub-freezing conditions.

Known fuel cells typically utilize a coolant system supplying a flow of cooling fluid through a cooler plate within the fuel cell to maintain the cell within an optimal temperature range. The cooler plate may be sealed as described in U.S. Pat. No. 5,804,326 that issued on Sep. 8, 1988 to Chow, et al., or the plate may be in diffusable communication with the electrodes or other fuel cell components as described in U.S. Pat. No. 5,503,944 that issued on Apr. 2, 1996 to Meyer et al., which patent is owned by the assignee of all rights in the fuel cell with a direct antifreeze impermeable cooler plate invention described herein. Where the cooling fluid is a solution including water it also must be kept from freezing. It is known to utilize a conventional antifreeze solution such as ethylene glycol and water or propylene glycol and water as a cooling fluid in sealed coolant systems utilizing sealed cooler plates. However, such antifreeze solutions are not viable in cells with diffusable contact between the cooling fluid and fuel cell components because those antifreeze solutions are known to be adsorbed by and poison the catalysts that form electrodes in the cell. Furthermore, those antifreeze solutions have low surface tensions which result in the solutions wetting any porous, wetproofed support layers adjacent cell catalysts, thereby impeding diffusion of reactant fluids through the support layers to the catalysts, which further decreases performance of the electrodes. Also, the vapor pressure of such conventional antifreezes is high, resulting in excessive loss rates of the antifreeze solutions through fuel cell exhaust streams.

It is known and desirable to use commercial graphite, or graphite-polymer composites to form cooler plates in order to both direct and contain a flow of conventional organic antifreezes through a fuel cell. However, under fuel cell operating conditions that include an electrochemical potential, such graphite materials often develop a through-plane porosity which permits conventional antifreeze solutions to wick due to capillary action or due to a positive pressure differential from the cooler plate into adjacent cell components and to cell catalysts, thereby poisoning the catalysts and/or impeding movement of reactant and product fluids through the components, resulting in a decrease in overall cell performance. Consequently, coolant systems of fuel cells that utilize a conventional antifreeze solution are known to be sealed from the electrodes, so that the solution is not in direct fluid communication with the electrodes.

Sealed cooler plates are commonly known to be metal in order to prevent loss of the conventional antifreeze from the plate into adjacent cell components. In PEM fuel cells, it is known that the water within the cell frequently has a pH of between 4.0–4.5. Such a pH along with ordinary cell potentials results in common heat exchanger metals such as copper, iron, steel or aluminum being unacceptable due to excessive corrosion rates. Stainless steels have suitable corrosion resistance, however, it is known that their surfaces form a nonconductive passivation layer that increases resistance of cooler plates fabricated of stainless steels to unacceptable levels. Therefore, expensive platings of noble metals such as gold are frequently used that are known to be both costly and unreliable. It is also known to use transition metals such as tantalum, titanium, niobium, etc. or alloys thereof as a base plated with gold or platinum, or to use gold or titanium alloys alone, which is also quite costly.

In fuel cell stacks utilizing a plurality of such metal cooler plates that are impermeable to conventional antifreeze solutions, the manifolds that distribute the antifreeze between various cooler plates within the cell stack must include seals against loss of the antifreeze into fuel cell components that would result in degradation of fuel cell performance. In a common fuel cell stack assembly containing typically 200–500 cells, there will be several hundred antifreeze coolant seals within the cell stack assembly. Because of high vapor pressure and low surface tension of conventional antifreezes, known antifreeze coolant seals must therefore be complicated and hence expensive.

Accordingly there is a need for a fuel cell that may be operated in sub-freezing conditions that does not require a costly, unreliable antifreeze impermeable cooler plate.

DISCLOSURE OF THE INVENTION

A fuel cell with a direct antifreeze impermeable cooler plate is disclosed for producing electrical energy from reducing fluid and process oxidant reactant streams. The fuel cell includes an electrolyte secured between an anode catalyst and a cathode catalyst; an anode flow field secured adjacent the anode catalyst for directing the reducing fluid to pass adjacent the anode catalyst; a cathode flow field secured adjacent the cathode catalyst for directing the process oxidant stream to pass adjacent the cathode catalyst; a direct antifreeze impermeable cooler plate secured in heat exchange relationship with the cathode flow field; and a direct antifreeze solution passing through the cooler plate for controlling temperature within the fuel cell, wherein the direct antifreeze solution is an organic antifreeze solution that is non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures.

The direct antifreeze impermeable cooler plate may be any material that is impermeable to liquid and compatible with a fuel cell operating environment such as plated metals, or in a preferred embodiment, the cooler plate may be a fine pore graphite material having a mean pore size of less than one micron and a porosity of less than twenty-five per cent. In a further preferred embodiment, the direct antifreeze solution may be a special direct antifreeze solution having the following characteristics: 1. a freezing point of at least –20 degrees Fahrenheit (hereafter "° F."); 2. a surface tension greater than 60 dynes per centimeter (hereafter "dyne/cm") at a cell operating temperature of about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred antifreeze solution may be an alkanetriol direct antifreeze solution, and in particular an alkanetriol selected from the group consisting of glycerol, butanetriol, and pentanetriol. The direct, special direct, and alkanetriol direct antifreeze solutions have high surface tension and low volatility characteristics that facilitate usage of uncomplicated seals in manifolds that deliver the direct antifreeze solutions to the fuel cell cooler plate. In the event the cooler plate is made of a fine pore graphite material, the favorable high surface tension and low volatility characteristics of the direct antifreeze solution also restrict movement of the antifreeze as a liquid through the cooler plate into other fuel cell components.

In an additional embodiment, the direct antifreeze solution passing through the cooler plate may be directed to flow at a pressure that is less than a pressure of the process reactant streams passing through the fuel cell. A preferred fuel cell operates for example at near ambient pressure and the process oxidant stream and reducing fluid stream are pressurized to 1 to 2 pounds per square inch gauge (hereafter "PSIG") above ambient pressure, and the direct antifreeze solution is directed to flow through the direct antifreeze impermeable cooler plate at about 1 to 2 PSIG below ambient pressure. Such a positive pressure differential between the reactant streams and the direct antifreeze solution within the cooler plate further restricts movement of the direct antifreeze solution out of the cooler plate.

Accordingly it is a general object of the present invention to provide a fuel cell with a direct antifreeze impermeable cooler plate that overcomes deficiencies of the prior art.

It is a more specific object to provide a fuel cell with a direct antifreeze impermeable cooler plate that permits usage of a graphite cooler plate.

It is yet another object to provide a fuel cell with a direct antifreeze impermeable cooler plate that permits usage of uncomplicated seals in manifolds passing the direct antifreeze through the fuel cell.

It is another object to provide a fuel cell with a direct antifreeze impermeable cooler plate that restricts movement of the direct antifreeze out of the cooler plate into fuel cell components.

These and other objects and advantages of the present fuel cell with a direct antifreeze impermeable cooler plate will become more readily apparent when the following description is read in conjunction with the accompanying drawings.

DESCRIPTION OF THE PREFERRED EMBODIMENTS

Figure 1:
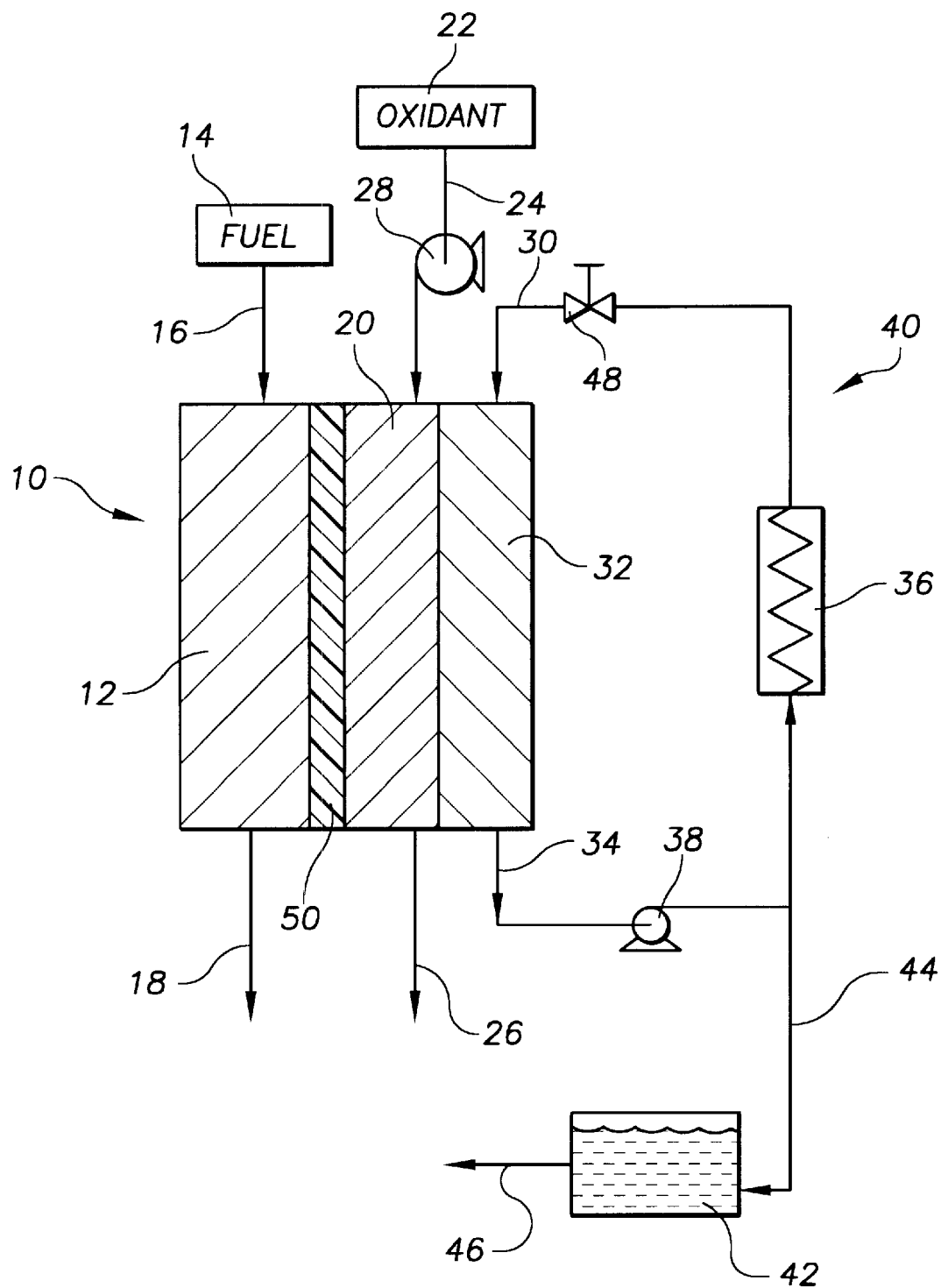
FIG. 1 is a schematic representation of a fuel cell with a direct antifreeze impermeable cooler plate constructed in accordance with the present invention.

Referring to the drawings in detail, a fuel cell with a direct antifreeze impermeable cooler plate of the present invention is shown in FIG. 1, and is generally designated by the reference numeral 10. The fuel cell 10 includes an anode flow field 12 that receives a reducing fluid directed from a fuel supply component 14 through a fuel passage 16 to flow through the anode flow field 12 and leave the cell 10 through a reducing fluid vent 18. The cell 10 also includes a cathode flow field 20 that receives a process oxidant stream directed from an oxidant supply component 22 through an oxidant passage 24 to flow through the cathode flow field 20 and out of the cell 10 through an oxidant vent 26. An oxidant blower 28 may be positioned on the oxidant passage 24 to variably flow the gaseous oxidant stream into the fuel cell 10. It is stressed, however, that preferably such a blower only increases operating pressures of the process oxidant stream to a range of from atmospheric pressure to about 1.0–2.0 pounds per square inch above atmospheric pressure, or from about 14.7 to about 16.7 pounds per square inch atmospheric (hereafter "PSIA").

A cooling fluid such as a direct antifreeze solution is directed through a coolant feed line 30 into a direct antifreeze impermeable cooler plate 32 of the fuel cell 10 adjacent the cathode flow field 20, and out of the fuel cell 10 in a coolant discharge line 34. The direct antifreeze impermeable cooler plate 34 may be in the form of a standard fuel cell cooler plate or may also be cooler plate including a coolant seal, wherein both the cooler plate and coolant seal may have a low but finite permeability to a conventional antifreeze. The coolant feed line 30 and coolant discharge line 34 may be in fluid communication with a coolant heat exchanger 36 to cool the cooling fluid, such as a radiator type of heat exchanger common to automobiles. A coolant pump 38 may be secured to the coolant feed line 30 to pump the cooling fluid into the direct antifreeze impermeable cooler plate 32, coolant discharge line 34, and coolant heat exchanger 36. When the coolant feed line 30, cooler plate 32, coolant discharge line 34 and coolant heat exchanger are in fluid communication as shown schematically in FIG. 1, those components may be characterized as a coolant loop 40, wherein the cooling fluid is described as a cooling fluid such as a direct antifreeze solution circulating through the direct antifreeze impermeable cooler plate 32 and circulating through the coolant loop 40. Alternatively, the coolant feed line 30 may direct the cooling fluid to pass through the direct antifreeze impermeable cooler plate 32 without cycling through the coolant loop 40. In such an embodiment, the cooling fluid may be part of an elaborate fuel cell water management system (not shown). A cooling fluid accumulator means 42 for accumulating liquid cooling fluid may also receive some of the cooling fluid flowing through the cooler plate 32, coolant discharge line 34 and an accumulator feed line 44. The cooling fluid accumulator means 42 may be well-known accumulator for directing the accumulated cooling fluid and fuel cell product water through an accumulator discharge line 46 so that the cooling fluid and product water may be directed to a cell humidification system (not shown), fuel processing components (not shown), or other components associated with fuel cell power plants as is well-known in the art. The accumulator also accommodates changes in cooling fluid volume due to changes in operating conditions.

The fuel cell 10 may also include a pressure control means in fluid communication with the cooler plate 32 for maintaining a positive pressure differential between the process oxidant and reducing fluid reactant streams passing through the fuel cell 10 within the anode and cathode flow fields 12, 20 and the cooling fluid passing through the cell 10 within the direct antifreeze impermeable cooler plate 32. The pressure control means may include the coolant pump 38 coordinated with a pressure control valve means for maintaining a specific pressure of the cooling fluid within the coolant feed line 30 down stream of the valve means, cooler plate 32 and coolant discharge line 34, such as pressure control valve 48 secured to the coolant feed line 30 between the coolant pump 38 and the direct antifreeze impermeable cooler plate 32. As is well-known, the pressure control valve 48 may be set manually, automatically, or, for example, may be electro-mechanically adjusted based upon a reference pressure within the reducing fluid and or process oxidant streams within the anode and/or cathode flow fields 12, 20 to restrict flow through the valve 48 so that the stream of cooling fluid drawn into the coolant pump 38 from the coolant feed line 30, direct antifreeze impermeable cooler plate 32 and coolant discharge line 34 is at a pressure lower than the pressure of the reactant streams within the anode and/or cathode flow fields 12, 20. Additional pressure control means for purposes herein may include any well-known mechanism that can reduce pressure of a liquid stream below a reference pressure of a gaseous stream, such as disclosed in U.S. Pat. No. 5,700,595, issued on Dec. 23, 1997 to Reiser and assigned to the assignee of the present invention, which patent is hereby incorporated herein by reference. The materials making up the coolant loop 40 may be manufactured of standard materials well-known in the art such as heat exchangers common to automobile technology, and piping and valving well-known in the chemical processing arts, etc.

The fuel cell 10 also includes a membrane electrode assembly 50 (hereafter occasionally referred to as "M.E.A." for convenience) secured between the anode flow field 12 and cathode flow field 20 that facilitates an electrochemical reaction involving the reducing fluid and process oxidant reactant streams to generate electrical energy that is conducted through a standard circuit (not shown) to an energy consuming load, such as an electric motor (not shown) to power, for example, a transportation vehicle (not shown). It is also well-known to secure the fuel cell 10 adjacent a plurality of similar fuel cells (not shown) to form a cell stack assembly enclosed within a frame structure that defines manifolds for directing the reducing fluid, process oxidant, and cooling fluid streams into and out of the fuel cell 10 in a manner well-known in the art.

Figure 2:
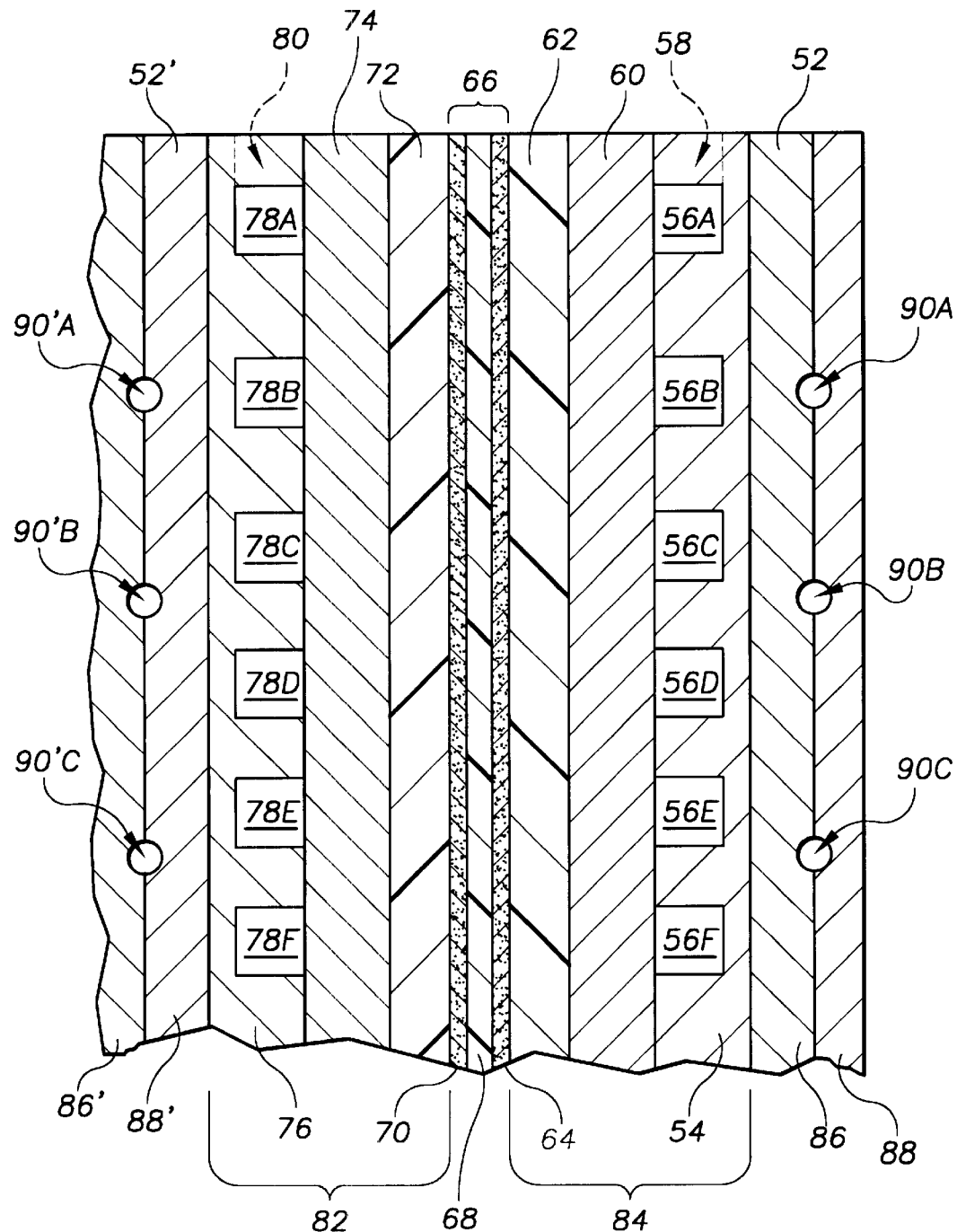
FIG. 2 is a schematic, cross-section, fragmentary view of fuel cell components of a fuel cell with a direct antifreeze impermeable cooler plate of the present invention showing the cooler plate adjacent a cathode flow field of the fuel cell.

FIG. 2 shows a cross-section, schematic representation of fuel cell components including a preferred embodiment of a direct antifreeze impermeable cooler plate 52. The cooler plate 52 is secured adjacent a porous oxidant supply layer 54 that may define a plurality of oxidant feed channels 56A, 56B, 56C, 56D, 56E, 56F, in fluid communication with an oxidant inlet 58 that receives the process oxidant stream from the oxidant inlet passage 24 (shown in FIG. 1). The oxidant supply layer 54 may be porous or solid, but not impermeable to flow of the coolant fluid. A porous cathode support layer 60 may be secured adjacent the oxidant supply layer 54, and a separate porous cathode diffusion layer 62 may be secured adjacent the cathode support layer 60. The cathode diffusion layer 62 is secured adjacent to and in intimate contact with a cathode catalyst 64 of a membrane electrode assembly ("M.E.A.") 66. As discussed above, the M.E.A. 66 includes an electrolyte 68 such as a proton exchange membrane, secured between the cathode catalyst 64 and an anode catalyst 70.

An anode diffusion layer 72 is secured adjacent the anode catalyst 70, and a porous anode support layer 74 is secured adjacent the anode support layer 72. A reducing fluid supply layer 76 is secured adjacent the anode support layer 74, that may define a plurality of reducing fluid feed channels 78A, 78B, 78C, 78D, 78E, 78F in fluid communication with a reducing fluid inlet 80 that receives the reducing fluid from the fuel passage 16 (shown in FIG.1). The reducing fluid supply layer 76 may be porous or solid, but not impermeable to flow of the coolant fluid. In FIG. 2, a second direct antifreeze impermeable cooler plate 52' is partially shown to represent a cooler plate of an adjacent fuel cell so that it is clear the cooler plates 52, 52' may be positioned between adjacent cells, or groups of cells in a fuel cell stack (not shown).

It is pointed out that a preferred anode flow field 82 (shown schematically in the FIG. 1 embodiment at reference numeral 12), may consist, in the FIG. 2 schematic representation, of the reducing fluid inlet 80, the plurality of reducing fluid feed flow channels 78A, 78B, 78C, 78D, 78E, 78F defined within the reducing fluid supply layer 76, the reducing fluid supply layer 76, along with the anode diffusion and anode support layers 72, 74. Similarly, a preferred cathode flow field 84 may consist of the oxidant inlet 58, the plurality of oxidant feed channels 56A, 56B, 56C, 56D, 56E, 56F defined within the oxidant supply plate 54, the oxidant supply plate 54, along with the cathode diffusion and cathode support layers 62, 60. Preferred anode flow field means for directing the reducing fluid to pass adjacent the anode catalyst and preferred cathode flow field means for directing the process oxidant stream to pass adjacent the cathode catalyst may also consist of cavities or differing channels or grooves defined within solid, non-porous components adjacent the anode and cathode catalysts, as is well-known in the art.

As seen in FIG. 2, the direct antifreeze impermeable cooler plate 52 may be a direct antifreeze impermeable cooler plate means for directing a direct antifreeze solution to pass in heat exchange relationship with a cathode catalyst and a cathode flow field, wherein the direct antifreeze impermeable cooler plate means 52 is constructed of cooperating first and second halves 86, 88 (shown as 86' and 88'0 in the second cooler plate 52' in FIG. 2). The first and second halves 86, 88 of the cooler plate 52 may be fabricated in a well-known mirror image association to cooperatively define between the two halves 86, 88 a plurality of coolant flow channels. 90A, 90B, 90C, (shown as 90'A, 90'B, 90'C in the second cooler plate 52') that direct flow of the direct antifreeze solution cooling fluid through the impermeable cooler plate 52. The direct antifreeze impermeable cooler plate means may be constructed of any material that is impermeable to liquid and is compatible with a fuel cell operating environment such as solid materials including stainless steels, plated metals and other metals known in the art. In a preferred embodiment the cooler plate 52 may be a fine pore graphite material such as commercial graphites having a mean pore size of less than one micron and having a porosity of less than twenty-five per cent.

The direct antifreeze solution may be any organic antifreeze solution that is essentially non-volatile at cell operating temperatures. For purposes herein, "non-volatile" is defined to mean that the antifreeze solution sustains a loss of less than 10% of its antifreeze for every 500 operating hours of the fuel cell at fuel cell operating temperatures. Alternatively, a first preferred direct antifreeze solution may be a special direct antifreeze solution having the following characteristics: 1. a freezing point of at least −20 degrees Fahrenheit (hereafter "° F."); 2. a surface tension greater than 60 dynes per centimeter (hereafter "dyne/cm") at about 150° F.; 3. a partial pressure of antifreeze above the solution at about 150° F. that is less than 0.005 mm of mercury (hereafter "mm Hg"); and, 4. that is capable of being oxidized by catalysts of the fuel cell at fuel cell voltages. A second preferred direct antifreeze solution may be an alkanetriol direct antifreeze solution, and in particular an alkanetriol selected from the group consisting of glycerol, butanetriol, and pentanetriol. The alkanetriol direct antifreeze may be an antifreeze solution containing any alkanetriol.

In operation of the fuel cell 10 with the direct antifreeze impermeable cooler plate 52, wherein the cooler plate 52 is fabricated of a fine pore graphite material having a mean pore size of less that one micron and a porosity of less than twenty-five per cent, because the direct, special direct and alkanetriol direct antifreeze solutions have high surface tension and low volatility characteristics, the direct antifreeze solution remains within the impermeable cooler plate, and does not transfer into the cathode or anode flow fields 84, 82 to interrupt movement of the reactant streams or product fluids through the flow fields 84, 82, and does not move from the cooler plate 52 to contact and thus poison the cathode or anode catalysts 64, 70. Additionally, in operation of the fuel cell wherein the direct antifreeze impermeable cooler plate 52 is fabricated of a solid material such as a stainless steel or a plated metal, the favorable low volatility and high surface tension characteristics of the direct antifreeze solutions inhibit the direct antifreeze from penetrating out of a plurality of seals (not shown) within manifolds (not shown) that direct flow of the direct antifreeze solution into and between cells within a fuel cell stack.

It is pointed out that if the direct antifreeze impermeable cooler plate 52 were to be constructed of a fine pore graphite material, the direct antifreeze solution would fill the open pore volume of the cooler plate 52 so that the direct antifreeze solution would thereby form a gas barrier or seal preventing the gaseous reducing fluid from an adjacent cell (not shown) from flowing into or through the cooler plate 52 to mix with the oxidant stream within the cathode flow field 84, and likewise preventing the process oxidant stream within the cathode flow field 84 from passing through the cooler plate 52 into an anode flow field of an adjacent cell (not shown). Additionally, the porous cathode support layer 60 and/or the porous cathode diffusion layer 62 may be wetproofed to make them hydrophobic and to thereby form a wetproofed cathode support means for defining a hydrophobic region between the cathode catalyst 64 and the direct antifreeze impermeable cooler plate 32 Likewise, the porous anode support layer 74 and anode diffusion layer 72 may also be wetproofed by a hydrophobic substance such as the well known "TEFLON" (a trademark of the E.I. DuPont Company of Willmington, Del.) to further restrict migration of any of the direct antifreeze solution out of the cooler plate 52.

An exemplary fuel cell including a PEM electrolyte, a fine pore commercial graphite embodiment of the direct antifreeze impermeable cooler plate 52, wetproofed anode and cathode support layers 74, 60 and anode and cathode diffusion layers 72, 62 is proposed that would demonstrate efficient performance without unacceptable loss from the cooler plate 52 of a glycerol-water antifreeze solution to the anode or cathode catalysts 70, 64. The proposed exemplary fuel cell includes a 15 micron PEM within a membrane electrode assembly available from W.L. Gore and Associates, Inc. of Elkton, Md. as product identification no. "PRIMEA—5560". The anode catalyst consists of a platinum-ruthenium alloy containing 0.4 milligrams per square centimeter of platinum and 0.2 milligrams per square centimeter of ruthenium. The cathode catalyst is platinum at 0.4 milligrams per square centimeter.

The anode and cathode support layers are porous carbon-carbon fibrous composite having a thickness of approximately 0.006–0.007 inches, and a porosity of about 65–75 percent, and are available as grade TGP-H-060 from the Toray Company of New York, N.Y. The anode and cathode support layers are uniformly wetproofed with TEFLON (a trademark) grade "FEP—121" sold by the E.I. DuPont Company, of Willmington, Del., to a concentration of approximately 0.18 grams per cubic centimeter by wetproofing procedures well-known in the art.

The porous anode and cathode gas diffusion layers are applied to both the anode and cathode support layers by procedures well-known in the art and described in U.S. Pat. No. 4,233,181, which patent is owned by the assignee of all rights in the present invention, and which patent is hereby incorporated herein by reference. The anode and cathode diffusion layers are approximately 0.003–0.004 inches thick, and have a mass of approximately 5.4 milligrams per square centimeter. The anode and cathode gas diffusion layers consist of about 50 percent Vulcan XC-72 available from the Cabot Corporation of Billerica, Mass. and about 50 percent Teflon, grade "TFE-30", available from the aforesaid E. I. Dupont Company. The anode and cathode gas diffusion layers are heated to approximately 660° F. for about 5 minutes to make them wetproofed or hydrophobic.

The cell anode flow field is porous and is defined as the pore volume within the reducing fluid supply plate 76 and feed channels 78A, 78B, 78C, 78D, 78E, 78F, the anode diffusion layer 72 and anode support layer 74. The cathode flow field likewise is porous and is defined as the pore volume within the oxidant supply plate 54 and feed channels 56A, 56B, 56C, 56D, 56E, 56F, the cathode diffusion layer 62, and the cathode support layer 60. An exemplary reducing fluid supply plate 76 and an exemplary oxidant supply plate 54 are carbon-carbon fibrous composites with a porosity of approximately seventy per cent, and a mean pore size of approximately 30 microns.

An exemplary fine pore direct antifreeze impermeable cooler plate 52 is a fine pore commercial graphite material made from grade "ZXF-5Q" graphite, manufactured by Poco Graphite, Inc., of Decatur, Tex., having a pore size of 0.3 microns, and a total porosity of approximately twenty per cent. Additional preferred fine pore graphite materials for making the direct anti freeze impermeable cooler plate include the following grades manufactured by the aforesaid Poco Graphite, Inc.: grade "ACF-10Q" graphite having a pore size of 0.8 microns, and a total porosity of twentyone per cent; grade "AXF-5Q" graphite having a pore size of 0.8 microns and a total porosity of twenty per cent; grade "AXM-5Q" graphite having pore size of 0.8 microns and a total porosity of twenty-three percent; and, "AXZ-5Q" graphite having a pore size of 0.7 microns and a total porosity of twenty-six per cent. It is stressed that preferred fine pore commercial graphites are typically not additionally treated to increase the density of the graphites with carbon, and the graphites may also be impregnated with resin to reduce porosity, wherein the resin is compatible with a fuel cell operating environment.

The unique physical and chemical properties of the fuel cell with a direct antifreeze impermeable cooler plate 10 cooperate to produce unexpected and valuable results. In use of an embodiment utilizing a fine pore commercial graphite material for the direct antifreeze impermeable cooler plate, the liquid direct antifreeze solution remains within the cooler plate 52 because of the low volatility and high surface tension characteristics of the direct, special direct and alkanetriol direct antifreeze solutions. Therefore, the direct antifreeze solution does not transfer into the cathode or anode flow fields to interrupt movement of reactant or product fluid streams flowing through the anode and cathode flow fields 82, 84, and the liquid direct antifreeze solution does not move from the cooler plate 52 to contact and thus poison the cathode or anode catalysts 64, 70. Consequently, the fuel cell may utilize desirable commercial graphite materials to fabricate the direct antifreeze impermeable cooler plate 52. Additionally, in use of a cooler plate fabricated of a direct antifreeze impermeable solid material such as stainless steels or a plated metal, the favorable low volatility and high surface tension characteristics of the direct, special direct, and alkanetriol direct antifreeze solutions inhibit the direct antifreeze solution from penetrating out of a plurality of seals within manifolds that direct flow of the direct antifreeze solution into and between fuel cells within a fuel cell stack assembly.

While the present invention has been described and illustrated with respect to a particular construction of a fuel cell with a direct antifreeze impermeable cooler plate 10, it is to be understood that the fuel cell is not to be limited to the described and illustrated embodiments. For example, while the exemplary fuel cell described above utilizes a PEM electrolyte, the fuel cell 10 may use alternative electrolytes known in the art. Additionally, while the required properties for a direct antifreeze solution have been described relative to a fuel cell operating at about 150° F., it is to be understood that the required properties are independent of the operating temperature of the fuel cell 10. As a further example, the above descriptions refer to fuel cells operated at about or slightly above ambient pressures, however the scope of the present invention includes application to more highly pressurized fuel cells. Consequently, reference should be made primarily to the following claims rather than the foregoing description to determine the scope of the invention.

What is claimed is:

1. A fuel cell for producing electrical energy from reducing fluid and process oxidant reactant streams, comprising:
   a. an electrolyte secured between an anode catalyst and a cathode catalyst;
   b. an anode flow field secured adjacent the anode catalyst for directing the reducing fluid reactant stream to pass adjacent the anode catalyst;
   c. a cathode flow field secured adjacent the cathode catalyst for directing the process oxidant reactant stream to pass adjacent the cathode catalyst;
   d. a direct antifreeze impermeable cooler plate secured in heat exchange relationship with the cathode flow field; and,
   e. a direct antifreeze solution passing through the direct antifreeze impermeable cooler plate for controlling a temperature within the fuel cell, wherein the direct antifreeze solution is an alkanetriol direct antifreeze solution.

2. The fuel cell of claim 1, wherein the antifreeze solution is an alkanetriol direct antifreeze solution selected from the group consisting of glycerol, butanetriol, and pentanetriol.

3. The fuel cell of claim 1, wherein the direct antifreeze impermeable cooler plate is constructed of a fine pore graphite material having a mean pore size of less than one micron and a porosity of less than twenty-five per cent.

4. A fuel cell power plant for producing electrical energy from reducing fluid and process oxidant reactant streams, comprising:
   a. an electrolyte secured between an anode catalyst and a cathode catalyst;
   b. an anode flow field secured adjacent the anode catalyst for directing the reducing fluid reactant stream to pass adjacent the anode catalyst;
   c. a cathode flow field secured adjacent the cathode catalyst for directing the process oxidant reactant stream to pass adjacent the cathode catalyst;

d. a direct antifreeze impermeable cooler plate secured in heat exchange relationship with the cathode flow field;

e. a direct antifreeze solution passing through the direct antifreeze impermeable cooler plate for controlling a temperature within the fuel cell, wherein the direct antifreeze solution is an alkanetriol direct antifreeze solution; and, f. pressure control means in fluid communication with the direct antifreeze impermeable cooler plate for maintaining a positive pressure differential between the process oxidant stream passing through the cathode flow field and the direct antifreeze solution passing through the cooler plate so that the process oxidant stream within the fuel cell is at a greater pressure than the direct antifreeze solution within the cooler plate.

5. The fuel cell of claim 4, wherein the antifreeze solution is an alkanetriol direct antifreeze solution selected from the group consisting of glycerol, butanetriol, and pentanetriol.

6. The fuel cell of claim 4, wherein the direct antifreeze impermeable cooler plate is constructed of a fine pore graphite material having a mean pore size of less than one micron and a porosity of less than twenty-five per cent.

7. A fuel cell power plant for producing electrical energy from reducing fluid and process oxidant reactant streams, comprising:

a. an electrolyte secured between an anode catalyst and a cathode catalyst;

b. an anode flow field secured adjacent the anode catalyst for directing the reducing fluid reactant stream to pass adjacent the anode catalyst;

c. a cathode flow field secured adjacent the cathode catalyst for directing the process oxidant reactant stream to pass adjacent the cathode catalyst;

d. a direct antifreeze impermeable cooler plate secured in heat exchange relationship with the cathode flow field;

e. a wetproofed cathode support secured in fluid communication with both the cathode catalyst and the direct antifreeze impermeable cooler plate for defining a hydrophobic region between the cathode catalyst and the direct antifreeze impermeable cooler plate; and, f. a direct antifreeze solution passing through the direct antifreeze impermeable cooler plate for controlling a temperature within the fuel cell, wherein the direct antifreeze solution is an alkanetriol direct antifreeze solution.

8. The fuel cell of claim 7, further comprising a wetproofed anode support secured in fluid communication with both the anode catalyst and the direct antifreeze impermeable cooler plate for defining a hydrophobic region between the anode catalyst and the direct antifreeze impermeable cooler plate.

9. The fuel cell of claim 8, further comprising pressure control means in fluid communication with the direct antifreeze impermeable cooler plate for maintaining a positive pressure differential between the process oxidant stream passing through the cathode flow field and the direct antifreeze solution passing through the cooler plate so that the process oxidant stream within the fuel cell is at a greater pressure than the direct antifreeze solution within the cooler plate.

10. The fuel cell of claim 7, wherein the antifreeze solution is an alkanetriol direct antifreeze solution selected from the group consisting of glycerol, butanetriol, and pentanetriol.

11. The fuel cell of claim 7, wherein the direct antifreeze impermeable cooler plate is constructed of a fine pore graphite material having a mean pore size of less than one micron and a porosity of less than twenty-five per cent.

* * * * *